(12) United States Patent
Rodgers et al.

(10) Patent No.: US 9,906,493 B1
(45) Date of Patent: Feb. 27, 2018

(54) METHOD AND SYSTEM FOR VERIFYING THE INTEGRITY OF COMPUTING DEVICES

(71) Applicant: Skyport Systems, Inc., Mountain View, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Skyport Systems, Inc., Mountain View, CA (US)

( * ) Notice: Subject to any disclaimer, the term of this patent is extended or adjusted under 35 U.S.C. 154(b) by 0 days.

(21) Appl. No.: 14/705,469

(22) Filed: May 6, 2015

Related U.S. Application Data

(60) Provisional application No. 61/989,957, filed on May 7, 2014.

(51) Int. Cl.
*H04L 29/06* (2006.01)
*H04L 9/30* (2006.01)

(52) U.S. Cl.
CPC ............ *H04L 63/0209* (2013.01); *H04L 9/30* (2013.01); *H04L 63/0227* (2013.01)

(58) Field of Classification Search
CPC ......... H04L 9/3263; G06F 21/53; G06F 21/50
(Continued)

(56) References Cited

U.S. PATENT DOCUMENTS

| 7,870,153 B2 | 1/2011 | Croft et al. |
| 7,886,023 B1 | 2/2011 | Johnson |

(Continued)

OTHER PUBLICATIONS

Combining TLS and TPMs to Achieve Device and User Authentication for Wi-Fi and WiMAX Citywide Networks, Cen et al, 10.1109/WCNC.2008.491, IEEE, 2008.*
(Continued)

*Primary Examiner* — Jahangir Kabir
(74) *Attorney, Agent, or Firm* — Osha Liang LLP

(57) ABSTRACT

A method and system for verifying integrity of computing devices. The method includes providing a first integrity associated with a server executing on a computing device to a management service, and receiving, in response to providing the first integrity measurement, a first mutual attestation value from the management service. The method further includes providing a second integrity associated with a network adaptor executing on a computing device to a management service, and receiving, in response to providing the second integrity measurement, a second mutual attestation value from the management service. The method further includes performing a mutual attestation between the server and the network adaptor using the first mutual attestation value and the second mutual attestation value, and notifying the management service that the mutual attestation has been successfully completed.

17 Claims, 10 Drawing Sheets

(58) Field of Classification Search
USPC .................................. 713/155–156; 726/13
See application file for complete search history.

(56) References Cited

U.S. PATENT DOCUMENTS

| | | | |
|---|---|---|---|
| 8,010,679 B2 | 8/2011 | Low et al. | |
| 8,051,180 B2 | 11/2011 | Mazzaferri et al. | |
| 8,166,261 B1 | 4/2012 | Cremelie et al. | |
| 8,218,828 B2 | 7/2012 | Iasso | |
| 8,271,780 B2 * | 9/2012 | Xiao | H04L 41/0893 713/155 |
| 8,438,654 B1 | 5/2013 | von Eicken et al. | |
| 8,572,400 B2 * | 10/2013 | Lin | H04L 63/0428 713/155 |
| 8,607,054 B2 | 12/2013 | Ramarathinam et al. | |
| 8,613,071 B2 * | 12/2013 | Day | H04L 63/0281 380/277 |
| 8,661,252 B2 | 2/2014 | Chandwani | |
| 8,959,108 B2 | 2/2015 | Pereira et al. | |
| 9,294,621 B2 * | 3/2016 | Parmar | G06Q 30/02 |
| 9,495,379 B2 | 11/2016 | Zhang et al. | |
| 2005/0055456 A1 * | 3/2005 | Chalupsky | H04L 29/06 709/233 |
| 2007/0055703 A1 | 3/2007 | Zimran et al. | |
| 2010/0088405 A1 | 4/2010 | Huang et al. | |
| 2011/0162042 A1 * | 6/2011 | Xiao | H04L 41/28 726/3 |
| 2012/0117229 A1 | 5/2012 | Van Biljon et al. | |
| 2012/0151209 A1 * | 6/2012 | Visnyak | H04L 9/3234 713/166 |
| 2013/0185715 A1 | 7/2013 | Dunning et al. | |
| 2013/0205376 A1 * | 8/2013 | Narasimha | H04L 9/3247 726/6 |
| 2014/0101113 A1 | 4/2014 | Zhang et al. | |
| 2014/0123055 A1 | 5/2014 | Krleza | |
| 2014/0281500 A1 * | 9/2014 | Ignatchenko | H04L 9/3263 713/156 |
| 2014/0297779 A1 | 10/2014 | Pack et al. | |
| 2014/0344475 A1 | 11/2014 | Chen et al. | |
| 2015/0007250 A1 | 1/2015 | Dicato, Jr. et al. | |
| 2015/0215308 A1 | 7/2015 | Manolov et al. | |
| 2016/0021055 A1 | 1/2016 | Krzywonos et al. | |

OTHER PUBLICATIONS

TCG; Trusted Platform Module Library, Part1: Architecture Family "2.0" Level 00 Revision 00.96; Mar. 15, 2013, 267 pages.

* cited by examiner

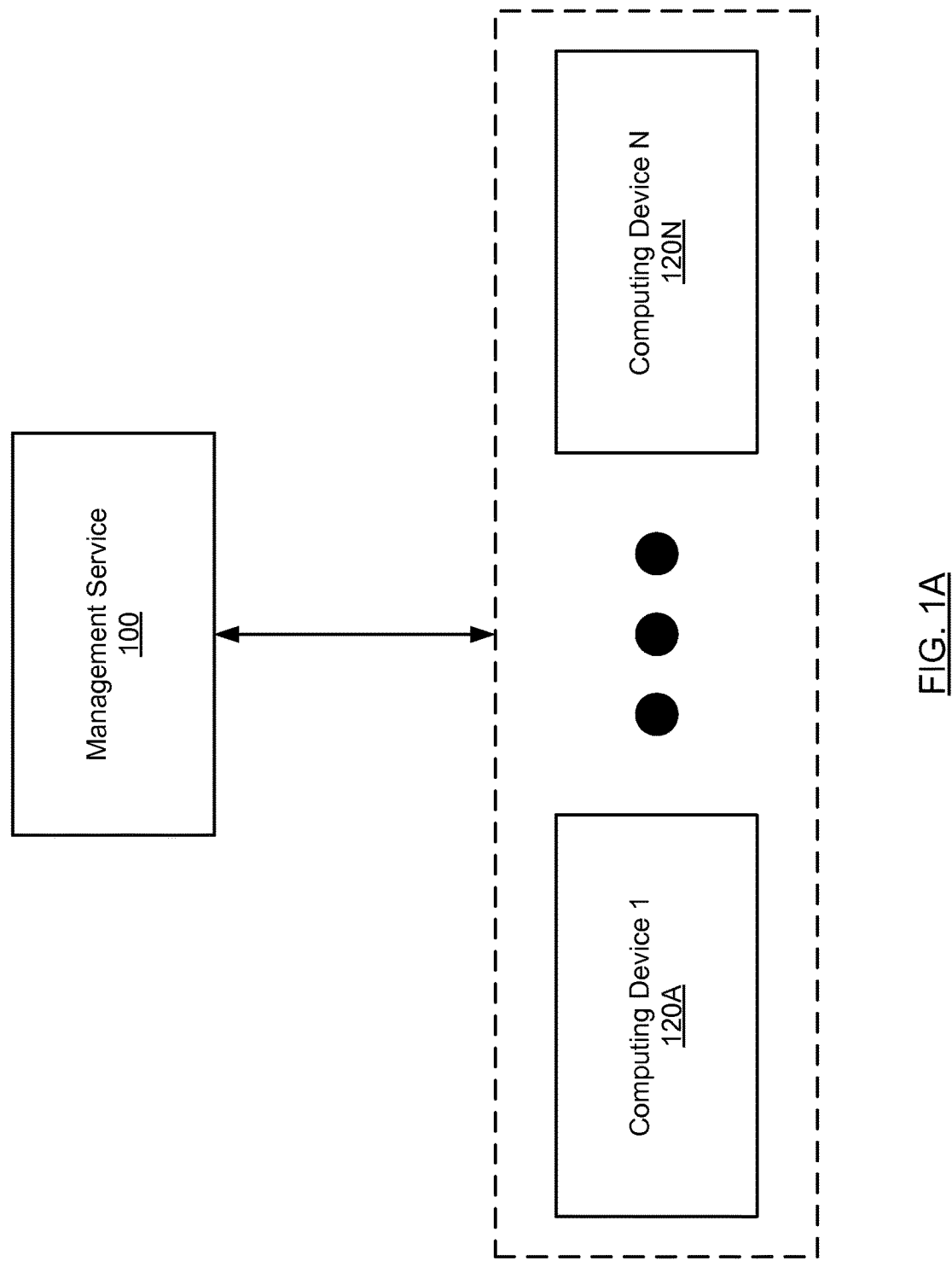

METHOD AND SYSTEM FOR VERIFYING THE INTEGRITY OF COMPUTING DEVICES

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Computing devices may be compromised, for example, by malicious code injected by an attacker or by hardware that has been tampered with or otherwise compromised.

SUMMARY

In general, in one aspect, the invention relates to a method for verifying integrity of computing devices. The method includes providing a first integrity associated with a server executing on a computing device to a management service, and receiving, in response to providing the first integrity measurement, a first mutual attestation value from the management service. The method further includes providing a second integrity associated with a network adaptor executing on a computing device to a management service, and receiving, in response to providing the second integrity measurement, a second mutual attestation value from the management service. The method further includes performing a mutual attestation between the server and the network adaptor using the first mutual attestation value and the second mutual attestation value, and notifying the management service that the mutual attestation has been successfully completed.

In general, in one aspect, the invention relates to a non-transitory computer readable medium including computer readable program code, which when executed by a computer processor enables the computer processor to provide a first integrity associated with a server executing on a computing device to a management service, and to receive, in response to providing the first integrity measurement, a first mutual attestation value from the management service. The computer readable program code further enables the computer processor to provide a second integrity associated with a network adaptor executing on a computing device to a management service, and to receive, in response to providing the second integrity measurement, a second mutual attestation value from the management service. The computer readable program code also enables the computer processor to perform a mutual attestation between the server and the network adaptor using the first mutual attestation value and the second mutual attestation, and to notify the management service that the mutual attestation has been successfully completed.

In general, in one aspect, the invention relates to a computing device. The computing device includes a server including a first trusted platform module (TPM) and configured to provide, using the first TPM, a first integrity associated with the server to a management service, receive, in response to providing the first integrity measurement, a first mutual attestation value from the management service, perform at least a portion of a mutual attestation with a network adaptor using the first mutual attestation value and a second mutual attestation, and notify the management service that the mutual attestation has been successfully completed with the network adaptor. The computing device further includes a network adaptor including a second TPM and configured to provide, using the second TPM, a second integrity associated with the network adaptor to a management service, receive, in response to providing the second integrity measurement, a second mutual attestation value from the management service, and perform at least a portion of the mutual attestation with the server using the first mutual attestation value and the second mutual attestation value, and notify the management service that the mutual attestation has been successfully completed with the network server.

Other aspects of the invention will be apparent from the following description and the appended claims.

BRIEF DESCRIPTION OF DRAWINGS

FIGS. 1A-1C show systems in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for verifying the integrity of computing devices. More specifically, in one or more embodiments of the invention, a management service verifies the integrity of the computing device(s). The management service may independently verify the integrity of different components of the computing device by verifying an attestation of each component. In one or more embodiments of the invention, the management service serves as a trust broker that, upon successful verification of the integrity of a component of the computing device, guarantees the integrity of the component to other components of the computing device. After successful verification of the integrity of all components of the computing device by the management service, a mutual attestation between the components within the computing device may establish a trust relationship between the components within the computing device, and, once mutual attestation has been completed, the components may begin to interact.

Figure 1B:
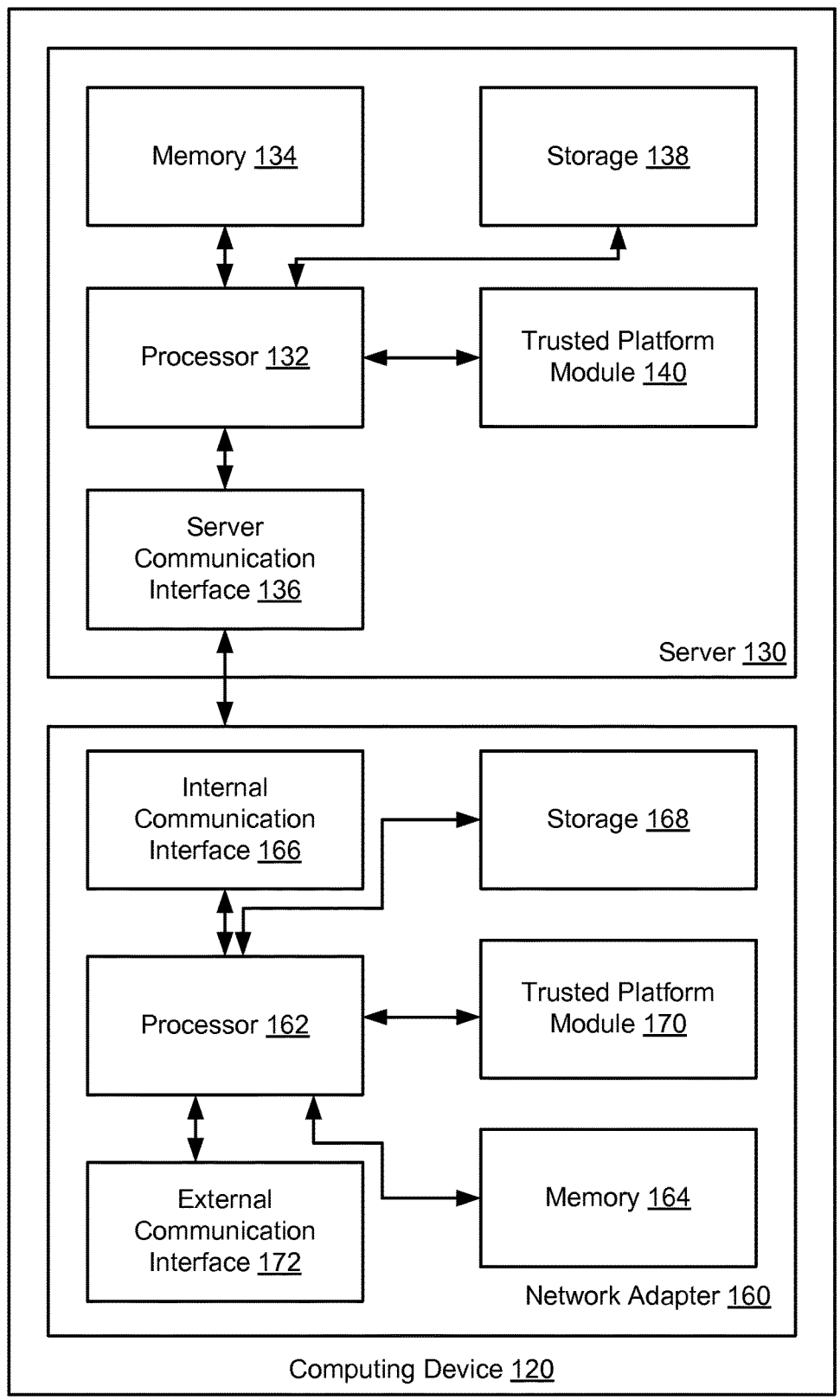

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 4-8).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is provided even in the case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device. The verification of the integrity of the computing devices is described in detail below, with reference to FIGS. 4-8.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trust Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

FIG. 1B shows a system in accordance with one or more embodiments of the invention. In one or more embodiments of the invention, computing device (120) includes two components: a server (130) and a network adapter (160). Each of these components is described below.

Figure 1C:
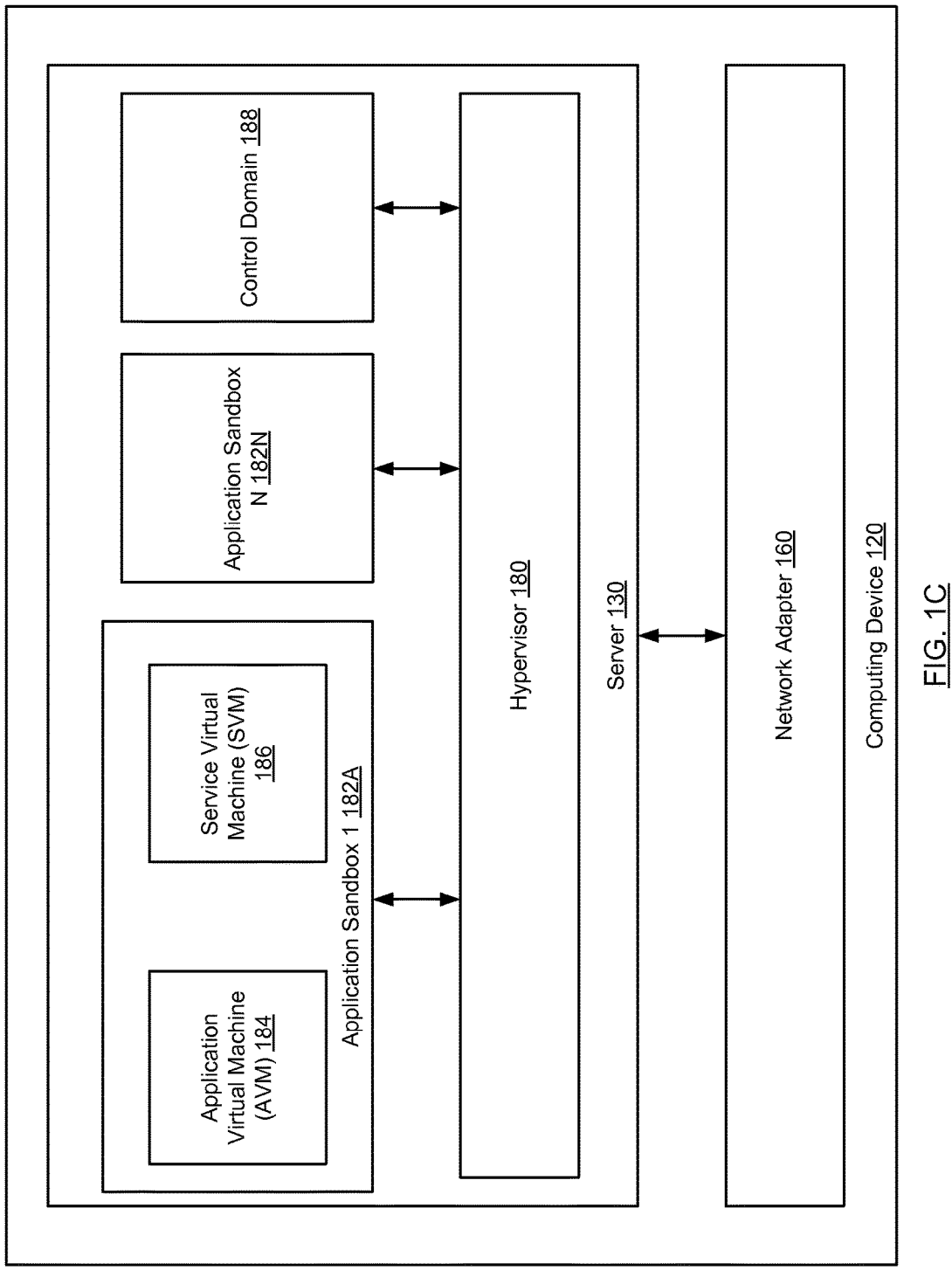

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multiple cores that are configured to execute instructions. In one embodiment of the invention, the processor may be implemented using a Complex Instruction Set (CISC) Architecture or a Reduced Instruction Set (RISC) Architecture.

In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trust Computing Group Trusted Platform Module specifications. In one embodiment of the invention, the TPM includes platform configuration registers (PCRs). A PCR may be a secure storage location within the TPM. The PCRs may be used to store integrity measurements obtained for software components, as further described below.

In one embodiment of the invention, the network adapter (160) includes functionality to control and/or provide network access between the server and other entities that are external to the computing device (e.g., other computing devices, the management services, and other systems (described above)). The network adapter (160) may also include functionality to control the server's (130) hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multiple cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that may be used to perform encryption and decryption functions on behalf of the processes executing in the server (130).

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein.

The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain.

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen® hypervisor (the mark is a registered trademark of Citrix, Santa Clara, Calif.), a kernel-based virtual machine (KVM), vSphere ESXi® (the mark is a registered trademark of VMware, Palo Alto, Calif.), or Hyper-V® (the mark is a registered trademark of Microsoft, Redmond, Wash.).

Figure 2:
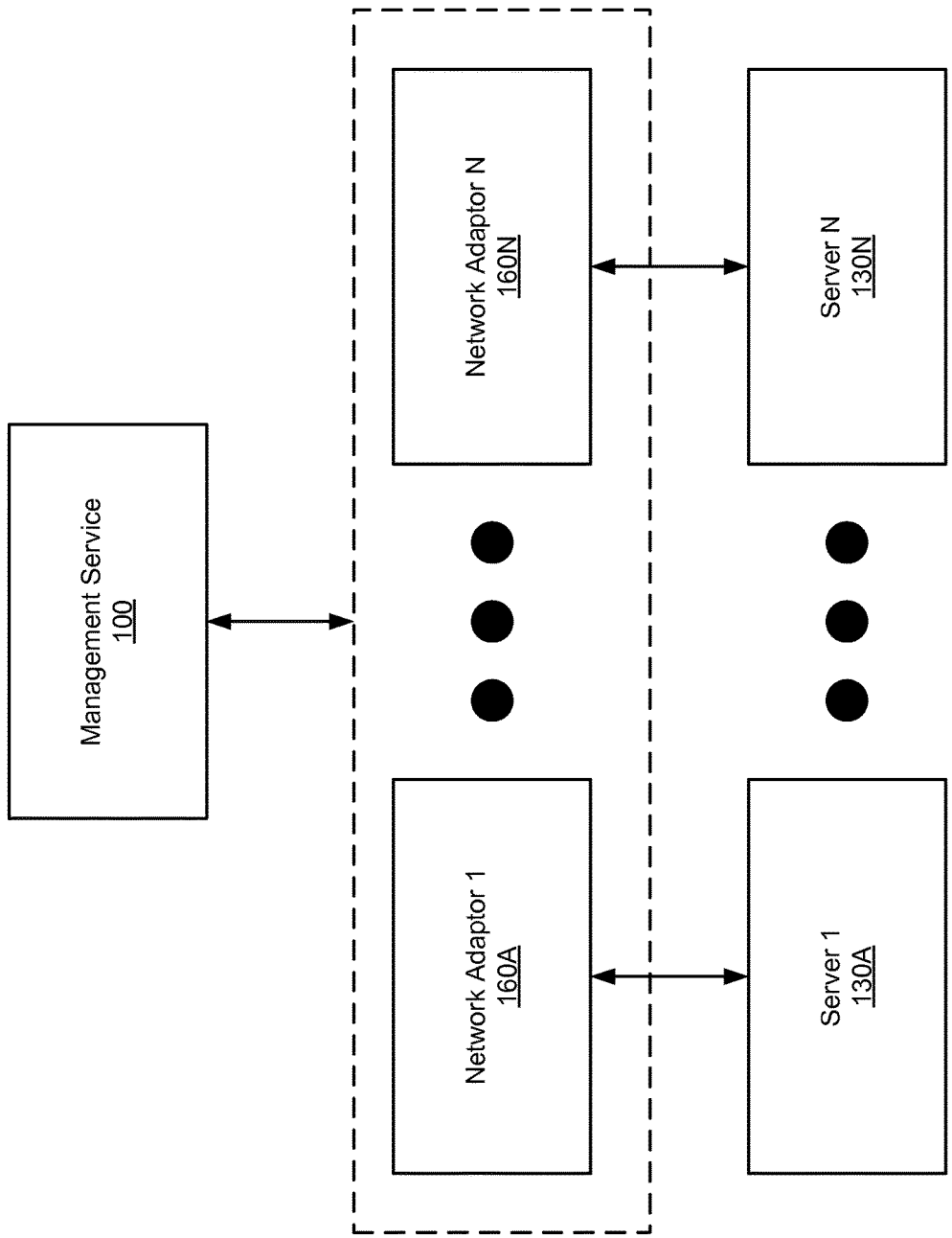
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
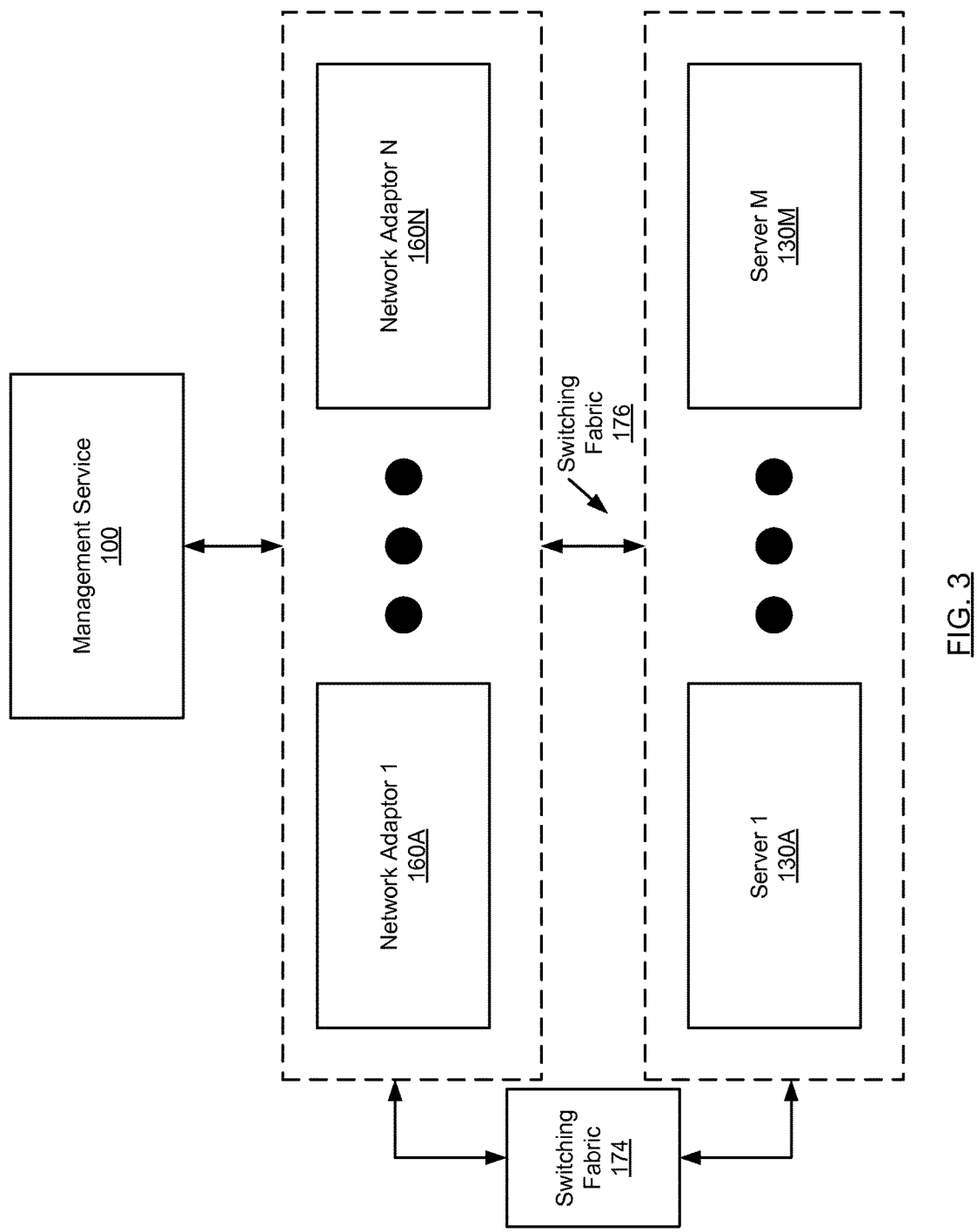
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/or mapping between the servers and network adapters i.e., the service processor (174) may assign network adapters (160A-160N) to servers (130A-130N), for example, based on availability, bandwidth and redundancy considerations.

One skilled in the art will recognize that the architecture of a system is not limited to the components shown in FIGS. 1A-3. As previously discussed, the system may include multiple computing devices, a computing device may include both server and network adapter, or server and network adapter may be physically separated components that may be locally or remotely connected. The connection between a server and a network adapter may be a logical connection that does not necessarily require a direct physical connection, i.e., the server and the network adapter may be separated by one or more intermediate network devices that establish the logical connection. Further, there may be a 1:1 relationship between servers and network adapters or there may be an arbitrary number of network adapters and an arbitrary number of servers, where the number of network adapters may be different from the number of servers. In addition, the mapping between network adapters and servers may be pre-defined and constant, or it may be dynamically managed, for example based on load and/or bandwidth considerations.

Figure 4:
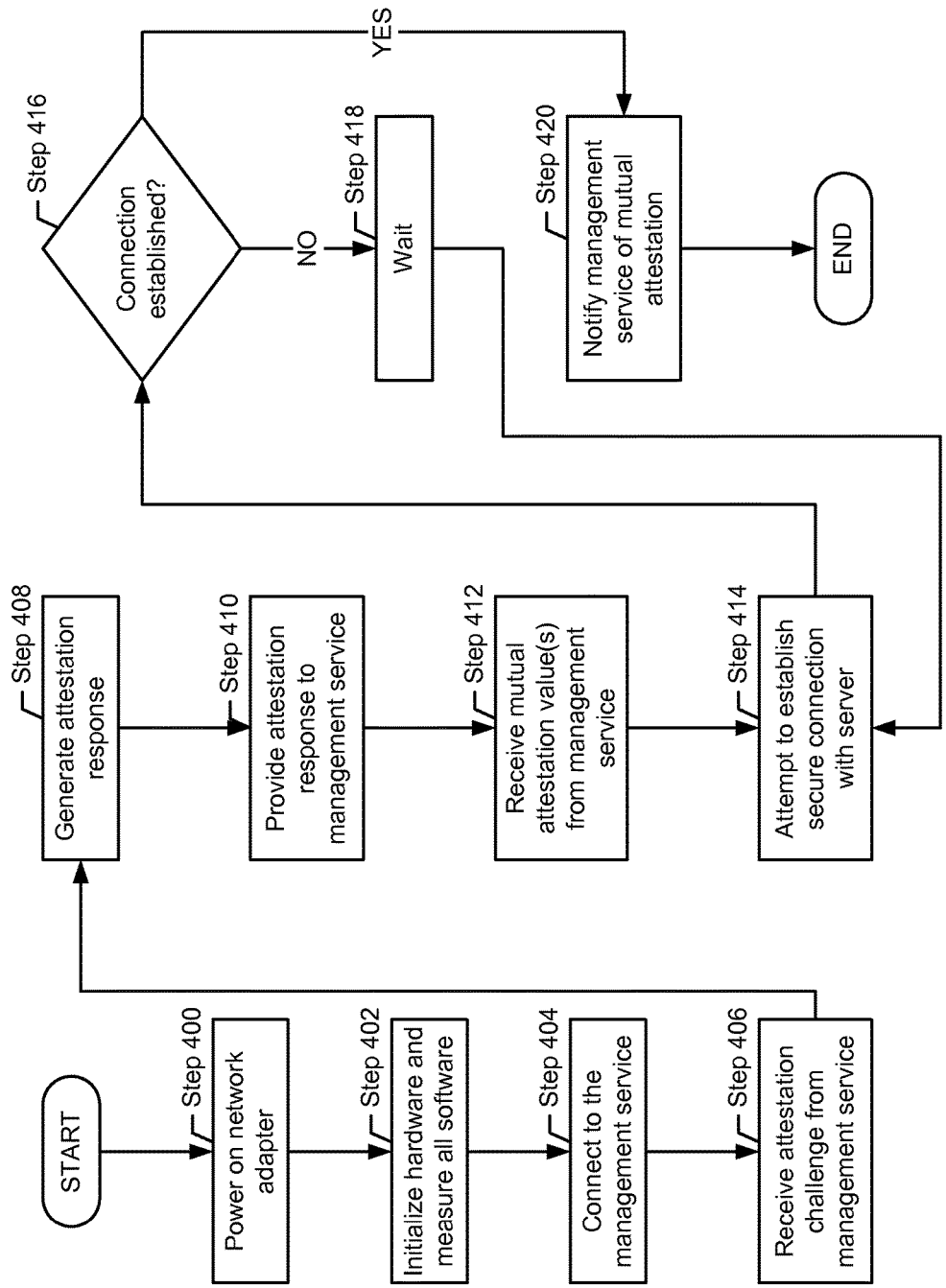
FIG. 4 shows a flowchart in accordance with one or more embodiments of the invention.
Figure 5:
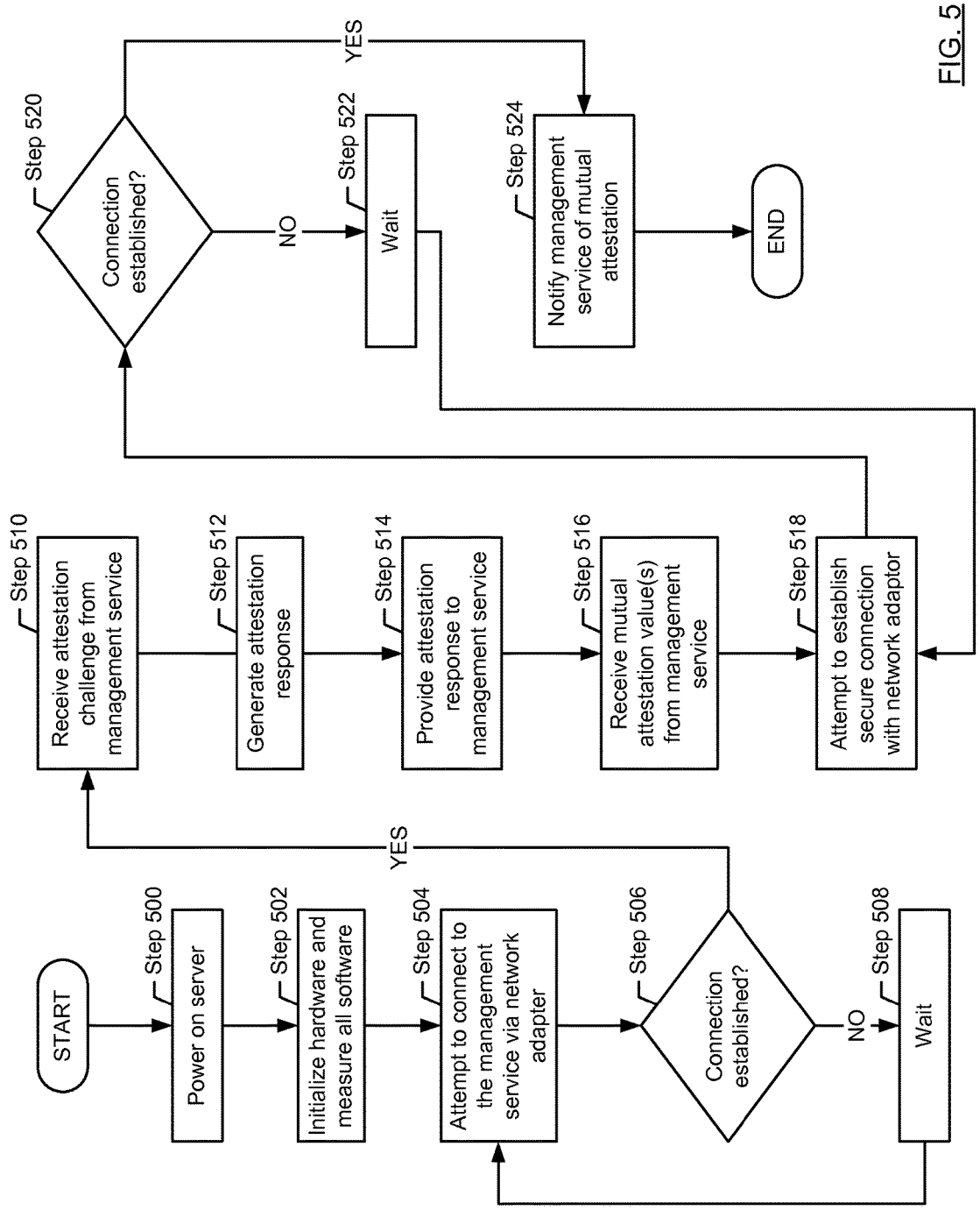
FIG. 5 shows a flowchart in accordance with one or more embodiments of the invention.
Figure 6:
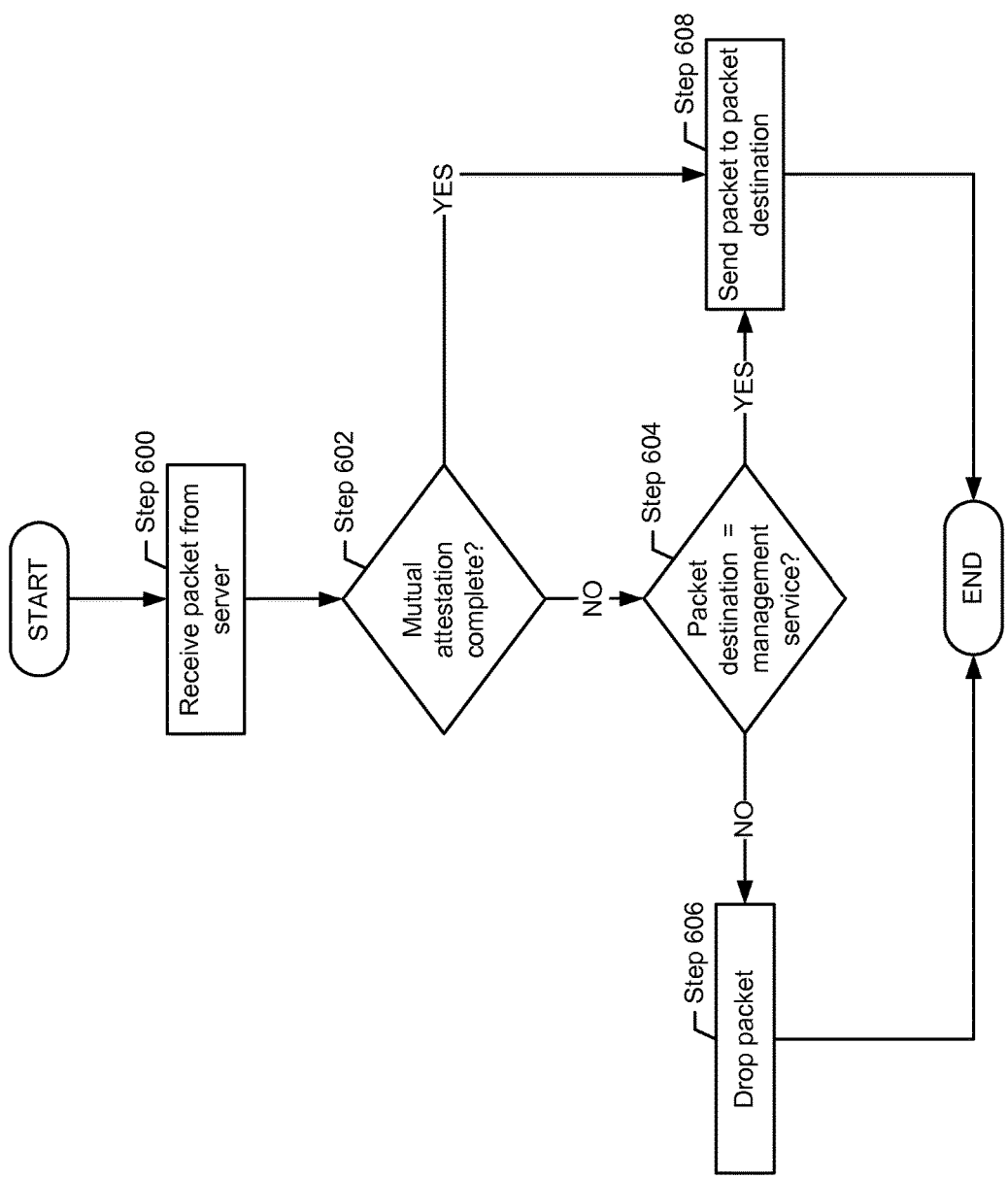
FIG. 6 shows a flowchart in accordance with one or more embodiments of the invention.
Figure 7:
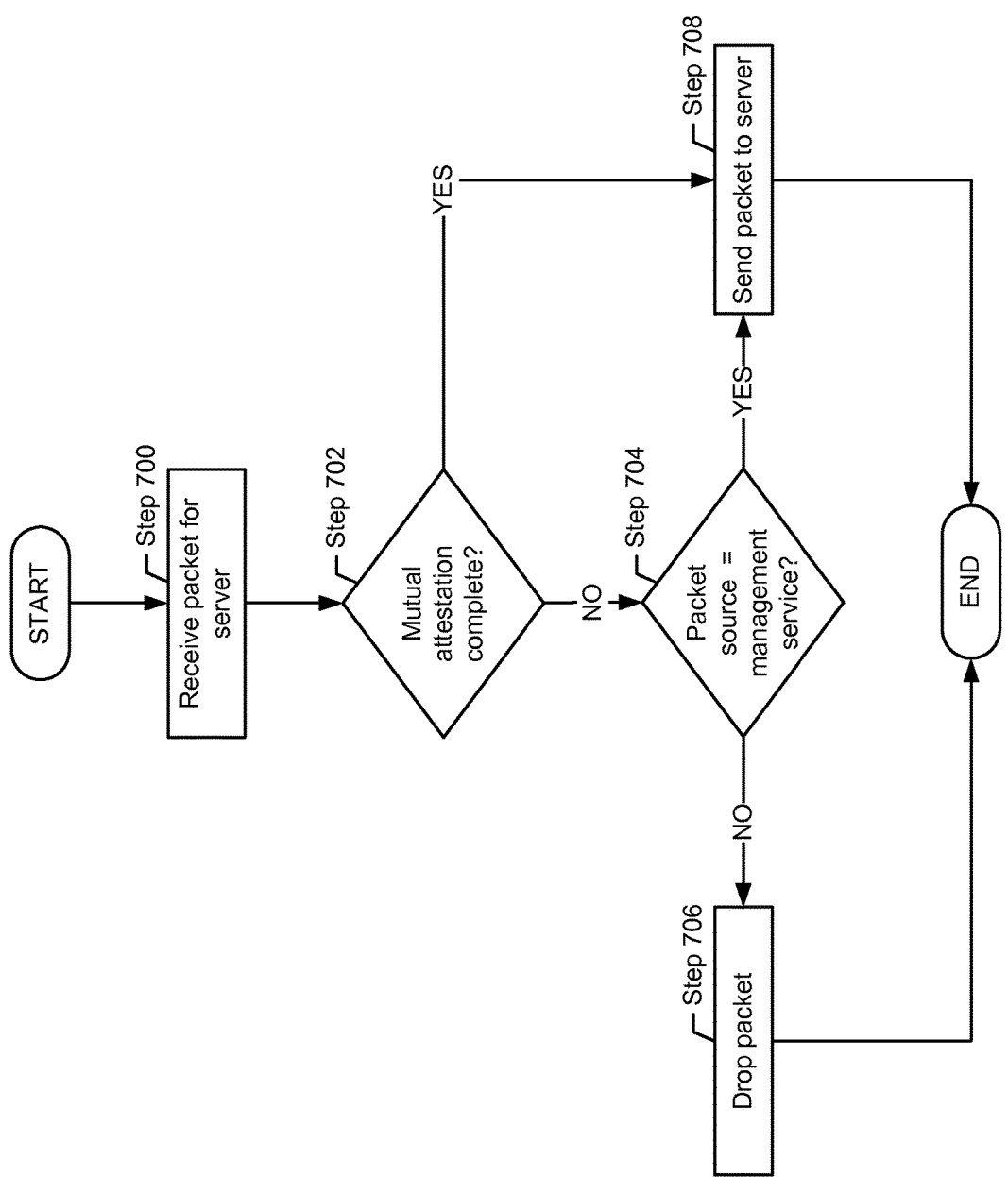
FIG. 7 shows a flowchart in accordance with one or more embodiments of the invention.

FIGS. 4-8 show flowcharts in accordance with one or more embodiments of the invention. FIGS. 4-8 describe a method for verifying the integrity of a computing device by the management service of the system. The method described in FIGS. 4-8 may be performed each time a computing device is turned on, reboots, after configuration changes, etc. FIG. 4 describes the steps performed by the network adapter, FIG. 5 describes the steps performed by the server, and FIG. 8 describes the steps performed by the management service. In one embodiment of the invention, the management service first verifies an attestation from the network adapter and the server in order to verify the integrity of the network adapter and of the server. The management service then mediates a mutual attestation between the network adapter and the server, by guaranteeing the integrity of the network adapter to the server, and by guaranteeing the integrity of the server to the network adapter, thus serving as an independent trust broker. FIGS. 6 and 7 describe the handling of network activity for different stages of the integrity verification being performed for a computing device.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 4-8 may be performed in parallel with any other steps shown in FIGS. 4-8 without departing from the invention.

Turning to FIG. 4, the steps executed by the network adapter, in accordance with one or more embodiments of the invention, are shown.

In Step 400, the network adapter is powered on. In embodiments of the invention, where the network adapter is integrated with the server, the network adapter may be powered on when the computing device is powered on. In embodiments where the network adapter is physically separated from the server, server and network adapter may be powered on separately.

In Step 402, the hardware of the network adapter is initialized. Initializing the hardware of the network adapter may include executing various instructions in order to prepare the network adapter for the subsequent attestation with the management service. These steps may include, for example, checking the hardware, booting a network adapter operating system, negotiating network protocols, establishing a link, etc. In one embodiment of the invention, the initialization may further include measuring the software images (also referred to as software binaries) of the network adapter. In one embodiment of the invention, integrity measurements may be obtained by performing cryptographic hashing (e.g., SHA-1 or SHA-2) on software images to be measured. The first measurement may be performed on the firmware image of the network adapter, the next measurement may be performed on the BIOS, subsequent measurements may be performed on device-specific firmware images, the boot loader, the operating system, etc. This procedure may continue until all software images of the network adapter are measured. The hashing operations may be performed by the processor of the network adapter. Subsequently, the resulting hash values may be provided to the TPM of the network adapter, which may perform additional hashing operations on the cryptographic hashes generated by the processor. The resulting hashes may be stored as measurements of the software images within PCRs of the network adapter's TPM. Each PCR may include sufficient space to store a single hash value. The hash value in a PCR may include multiple hash values representing measurements, combined into a single hash value, for example by performing an additional hashing operation. Further, the new hash value written to a PCR may result from concatenating hash values obtained from measurements with the current content of the PCR.

In Step 404, the network adapter connects to the management service in order to notify the management service of the network adapter's availability. In one embodiment of the invention, the network adapter may identify itself to the management service, for example, by providing a permanent hardware ID, such as a hardware serial number that is unalterably tied to the hardware of the network adapter.

In Step 406, the network adapter receives an attestation challenge from the management service (provided by the management service in Step 810), requesting the network adapter to attest to the management service. In one embodiment of the invention, the attestation challenge includes a request for specific integrity measurements stored in the PCRs of the network adapter's TPM. Further, the attestation challenge may include a nonce (i.e., a unique random number that is used only once, and that may be included in order to prevent playback attacks). In one embodiment of the invention, the attestation challenge includes a digital signature, generated using a private key known only to the management service, and also includes an identifier such as a fingerprint (e.g., a cryptographic hash) of the corresponding public key. In one embodiment of the invention, the network adapter uses the fingerprint to identify a public key in a secured database, accessible by the network adapter, that stores pre-provisioned public keys provided by the management service prior to deployment of the computing device. If the network adapter identifies a matching public key, the network adapter may use this public key to validate the signature provided by the management service, thus verifying that the attestation challenge is genuine and originated from the management service. In one embodiment of the invention, if any of the above verification steps fail, the network adapter discontinues the execution of the method described in FIG. 4.

In Step 408, the network adapter generates an attestation response. In one embodiment of the invention, the attestation response includes the nonce provided in Step 406 and the requested set of integrity measurements retrieved from the TPM's PCRs. In one embodiment of the invention, the attestation response further includes one or more serial numbers that are unique to hardware of the network adapter. In one embodiment of the invention, the network adapter may sign the attestation response using an identity key that the management service may subsequently use as an identifier for the network adapter, as further described below with reference to FIG. 8. In one embodiment of the invention, the identity key is a unique and unforgeable cryptographic key, bound to the TPM of the network adapter.

Further, in one embodiment of the invention, the identity key may have an expiration time, i.e., a new identity key may be periodically generated by the TPM of the network adapter. In Step 410, the network adapter sends the attestation response, generated in Step 408, to the management service, thus completing the steps performed by the network adapter for the remote attestation of the network adapter to the management service.

In Step 412, the network adapter receives a mutual attestation value or a set of mutual attestation values from the management service (provided by the management service in Step 820), if the management service has accepted the attestation response provided in Step 410, i.e., after the network adapter has successfully attested with the management service. The subsequent steps performed to achieve a mutual attestation between the network adapter and the server, may only be performed if both the network adapter and the server have successfully attested with the management service.

In one embodiment of the invention, the received mutual attestation value is a piece of data that is used in the subsequent steps to perform the mutual attestation between the network adapter and the server. In one embodiment of the invention, the mutual attestation value is any information that is conveyed to both the network adapter and the server, and that the network adapter and the server may subsequently use to prove to each other that they both have successfully undergone an attestation with the management service. The mutual attestation value may be, for example, a random number and/or character string. In another embodiment of the invention, the mutual attestation value received by the network adaptor may be different than the mutual attestation value received by the server (discussed above in FIG. 6). For example, the mutual attestation value received by the network adaptor may be a private key and the mutual attestation value received by the server may be a corresponding public key. In another example, the mutual attestation value received by the network adapter includes both a private key for the network adapter and a public key corresponding to a private key for the server, and the mutual attestation value received by the server includes both the private key for the server and the public key corresponding to the private key for the network adapter. The invention is not limited to the mutual attestation value examples listed above.

In one embodiment of the invention, management service may send a mutual attestation value to the network adaptor in a message that may only be decrypted by the network adaptor and may send a mutual attestation value to the server in a separate message that may only be decrypted by the server.

In another embodiment of the invention, the management service may issue a single message to the computing device that includes a first encrypted mutual attestation value for the network adaptor and a second encrypted mutual attestation value for the server. In this scenario, only the network adaptor may decrypt the first encrypted mutual attestation value and only the server may decrypt the second encrypted mutual attestation value.

Continuing with the discussion of FIG. 4, in Step 414, the network adapter attempts to establish a secure connection to the server. In one or more embodiments of the invention, a secure connection is established using the mutual attestation values as keys (or other values) that are required to establish a secure connection. For example, a secure connection may be established with the TLS protocol using the public and private keys provided as the mutual attestation values. In Step 414, instead of attempting to establish a secure connection between the server and the network adaptor using the mutual attestation values, a secure connection may be established between the server and the network adaptor and then the mutual attestation value(s) of each entity may be conveyed to the other entity via the secure connection. If each of the server and the network adaptor receives the expected mutual attestation value from the other entity, then the secure connection may remain open to permit further communication between the server and the network adaptor. However, if the expect mutual attestation value is not received by either the server or the network adaptor, then the secure connection is terminated.

In Step 416, a determination is made about whether the secure connection has been established between the server and the network adapter. If the secure connection has not been established, because the mutual attestation has not occurred or has otherwise failed, the method may proceed to Step 418. Those skilled in the art will appreciate that a non-secure connection may be used without departing from the invention.

In Step 418, the network adapter waits before returning to Step 414 in order to start another attempt to establish a secure connection with the server.

Returning to Step 416, if a determination is made that a connection between the server and the network adapter has been successfully established, the method may proceed to Step 420.

In Step 420, the network adapter notifies the management service of the completed mutual attestation, thus completing the steps performed by the network adapter for the mutual attestation between the network adapter and the server.

Turning to FIG. 5, the steps executed by the server, in accordance with one or more embodiments of the invention, are shown.

In Step 500, the server is powered on. In Step 502, the hardware of the server is initialized. Initializing the hardware of the server may include all steps necessary for preparing the server for the subsequent attestation with the management service. These steps may include, for example, checking the hardware, booting a server operating system, etc. In one embodiment of the invention, the initialization may further include measuring the software images of the server. In one embodiment of the invention, integrity measurements may be obtained by performing cryptographic hashing (e.g., SHA-1 or SHA-2) on software images to be measured. The first measurement may be performed on the firmware image of the server, the next measurement may be performed on the BIOS, subsequent measurements may be performed on device-specific firmware images, the boot loader, the operating system, application software images, etc. This procedure may continue until all images of the server have been measured. The hashing operations may be performed by the processor of the server. Subsequently, the resulting hash values may be provided to the TPM of the server, which may perform additional hashing operations on the cryptographic hashes generated by the processor. The resulting hashes may be stored as measurements of the software images within PCRs of the server's TPM. Each PCR may include sufficient space to store a single hash value. The hash value in a PCR may include multiple hash values representing measurements, combined into a single hash value, for example by performing an additional hashing operation. Further, the new hash value written to a PCR may result from concatenating hash values obtained from measurements with the current content of the PCR.

In Step 504, the server attempts to connect to the management service in order to notify the management service of the server's availability. In one embodiment of the invention, the server may identify itself to the management service, for example, by providing a permanent hardware ID, such as a hardware serial number that is unalterably tied to the hardware of the server.

In Step 506, a determination is made about whether a connection has been established. If the connection has not been established, for example, because the network adapter, providing the communication interface to the server, is not yet available, the method may proceed to Step 508 in order to wait before returning to Step 504. Returning to Step 506, if a determination is made that the connection to the management service has been established, the method may proceed to Step 510.

In Step 510, the server receives an attestation challenge from the management service (provided by the management service in Step 810), requesting the server to attest to the management service. In one embodiment of the invention, the attestation challenge includes a request for specific integrity measurements stored in the PCRs of the server's TPM. Further, the attestation challenge may include a nonce (i.e., a unique random number that is used only once, and that may be included in order to prevent playback attacks). In one embodiment of the invention, the attestation challenge includes a digital signature, generated using a private key known only to the management service, and also includes an identifier such as a fingerprint (e.g., a cryptographic hash) of a corresponding public key. In one embodiment of the invention, the server uses the fingerprint to identify a public key in a secured database, accessible by the server, that stores pre-provisioned public keys provided by the management service prior to deployment of the computing device. If the server identifies a matching public key, the server may use the matching public key to validate the signature provided by the management service, thus verifying that the attestation challenge is genuine and originated from the management service. In one embodiment of the invention, if any of the above verification steps fail, the server discontinues the execution of the method described in FIG. 5.

In Step 512, the server generates an attestation response. In one embodiment of the invention, the attestation response includes the nonce provided in Step 510 and the set of integrity measurements retrieved from the TPM's PCRs. In one embodiment of the invention, the attestation response further includes one or more serial numbers that are unique to hardware of the server. In one embodiment of the invention, the server may sign the attestation response using an identity key that the management service may subsequently use as an identifier for the server, as further described below with reference to FIG. 8. In one embodiment of the invention, the identity key is a unique and unforgeable cryptographic key, bound to the TPM of the server. Further, in one embodiment of the invention, the identity key may have an expiration time, i.e., a new identity key may be periodically generated by the TPM of the server. In Step 514, the server device sends the attestation response, generated in Step 512, to the management service, thus completing the steps performed by the server for the remote attestation of the server to the management service.

In Step 516, the server receives a mutual attestation value or a set of mutual attestation values (as described in FIG. 4, step 412) from the management service (provided by the management service in Step 820), if the management service has accepted the attestation response provided in Step 514, i.e., after the server has successfully attested with the management service. The subsequent steps, performed to achieve a mutual attestation between the network adapter and the server, may only be performed if both the network adapter and the server have successfully attested with the management service.

In Step 518, the server attempts to establish a secure connection to the network adapter (as described in FIG. 4, step 414).

In Step 520, a determination is made about whether the secure connection has been established between the server and the network adapter. If the secure connection has not been established, for example, because the mutual attestation has not occurred or has otherwise failed, the method may proceed to Step 522. Those skilled in the art will appreciate that a non-secure connection may be used without departing from the invention.

In Step 522, the server waits before returning to Step 518 in order to start another attempt to establish a secure connection with the network adapter.

Returning to Step 520, if a determination is made that a connection between the server and the network adapter has been successfully established, the method may proceed to Step 524.

In Step 524, the server notifies the management service of the completed mutual attestation, thus completing the steps performed by the server for the mutual attestation between the network adapter and the server.

Turning to FIG. 6, the steps describing the processing of network packets sent by the server are shown. In Step 600, a packet sent by the server is received by the network adapter. In one embodiment of the invention, the network adapter may be the only interface for the server to connect to a network, including the management service, other computing devices, etc. Accordingly, a packet, sent by the server, may be directed to the management service or any other reachable local or remote destinations in the network.

In Step 602 a determination is made about whether the mutual attestation between the server and the network adapter has been successfully completed, as previously described with reference to FIGS. 4 and 5, and as further described with reference to FIG. 8. If the mutual attestation has not yet been completed, the method may proceed to Step 604.

In Step 604, a determination is made about whether the destination of the network packet, sent by the server in Step 600, is the management service. If the destination of the packet is not the management service, the method may proceed to Step 606.

In Step 606, the packet is dropped. Accordingly, the packet is not delivered to the destination. In one embodiment of the invention, any communication, performed by the server, prior to completion of the mutual attestation, and that is not directed to the management service, may be blocked.

Returning to Step 604, if a determination is made that the destination of the packet is the management service, the method may proceed to Step 608.

Returning to Step 602, if a determination is made that the mutual attestation has been completed successfully, the method may proceed to Step 608. In Step 608, the network adapter may forward the packet to the destination. The destination may only be the management service if mutual attestation has not been completed. Alternatively, the destination may be any reachable destination if mutual attestation has been successfully completed.

Turning to FIG. 7, the steps describing the processing of network packets that are addressed to the server are shown.

In Step 700, a packet addressed to the server is received by the network adapter. In one embodiment of the invention, the network adapter may be the only interface for the management service and for other computing devices to reach the server.

In Step 702 a determination is made about whether the mutual attestation between the server and the network adapter has been successfully completed, as previously described with reference to FIGS. 4 and 5, and as further described with reference to FIG. 8. If the mutual attestation has not yet been completed, the method may proceed to Step 704.

In Step 704, a determination is made about whether the source of the network packet, received in Step 700, is the management service. If the source of the packet is not the management service, the method may proceed to Step 706.

In Step 706, the packet is dropped. Accordingly, the packet is not delivered to the server. In one embodiment of the invention, any communication, addressed to the server, prior to completion of the mutual attestation, and that does not originate from the management service, is therefore blocked. Accordingly, incoming communications to a server whose integrity has not yet been successfully verified (i.e., a server that may be hosting a compromised application) may be prevented.

Returning to Step 704, if a determination is made that the source of the packet is the management service, the method may proceed to Step 708.

Returning to Step 702, if a determination is made that the mutual attestation has been completed successfully, the method may proceed to Step 708. In Step 708, the network adapter may forward the packet to the server, regardless of the source of the packet if mutual attestation has been successfully completed. Alternatively, in step 708, the network adaptor may forward the packet to the server only if the source of the packet is the management service and mutual attestation has not been successfully completed.

Figure 8:
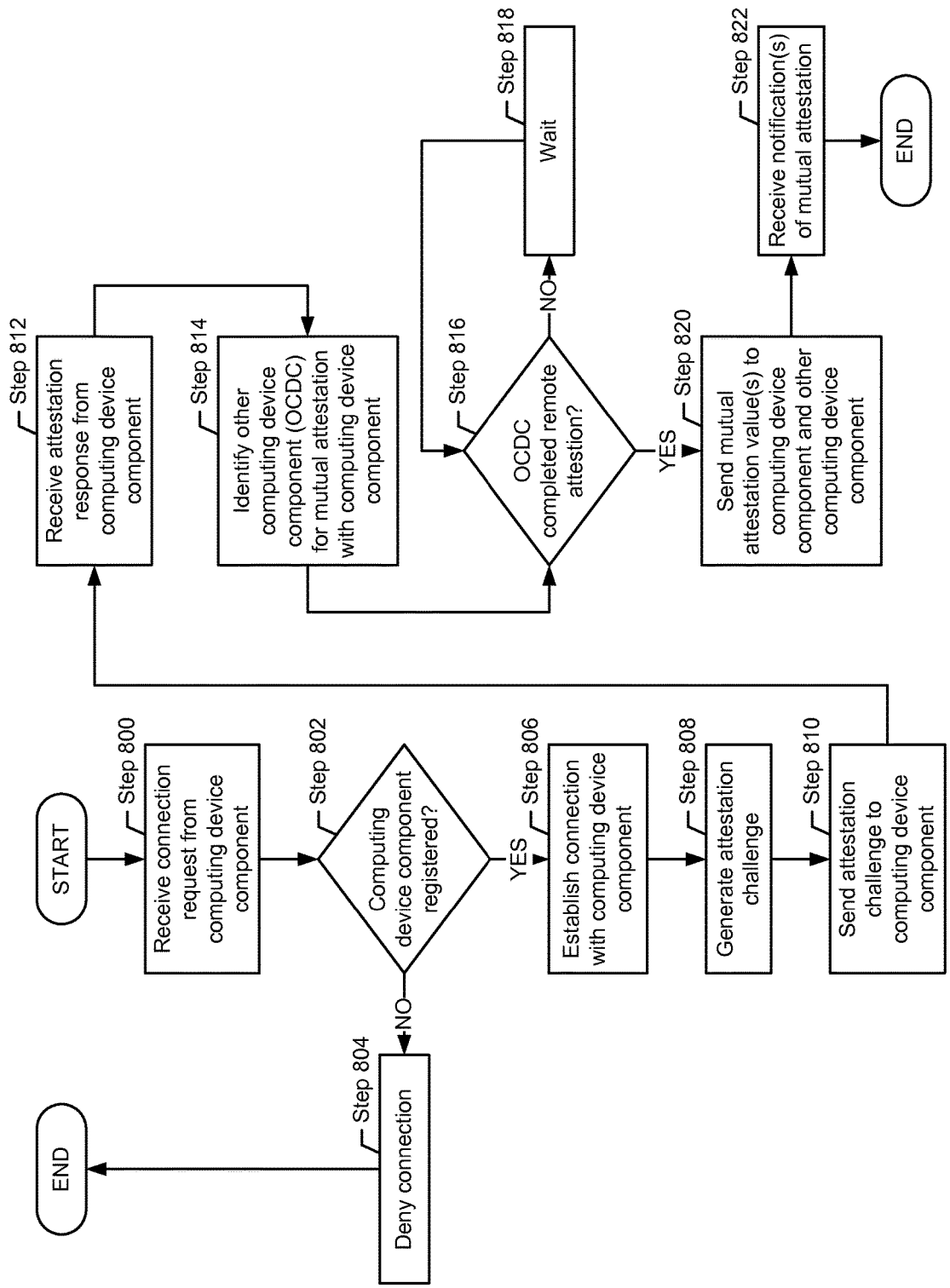
FIG. 8 shows a flowchart in accordance with one or more embodiments of the invention.

Turning to FIG. 8, the steps performed by the management service when performing the method for verifying the integrity of the computing device by the management service, in accordance with one or more embodiments of the invention, are shown.

In Step 800, the management service receives a connection request from a computing device component. In one embodiment of the invention, the computing device component is the server sending a connection request (Step 504) or the network adapter sending the connection request (Step 404).

In Step 802, a determination is made about whether the computing device component has been registered with the management service. In one embodiment of the invention, the connection request by the computing device component includes an identifier that is unique to the computing device component, e.g., a hardware serial number, thereby enabling the management service to identify the computing device component that initiated the connection. In one embodiment of the invention, the management service has been pre-provisioned with a set of expected identifiers stored in a secure database that represent computing device components of a computing device that may perform an attestation with the management service, prior to deployment of the computing device. The management service may compare the identifier, received from the computing device component in Step 800, with the expected identifiers in the database in order to determine whether the computing device component is registered and therefore authorized to participate in an attestation. If a determination is made that the computing device component is not registered, the method may proceed to Step 804, where the connection request is denied.

Returning to Step 802, if a determination is made that the computing device component is registered, the method may proceed to step 806. In Step 806, the management service establishes a connection with the computing device component, i.e., with the server (server attempting to connect to management service in Step 504) or the network adapter (network adapter attempting to connect to management service in Step 404).

In Step 808, the management service generates the attestation challenge (as described above in FIGS. 4 and 5). In Step 810, the management service sends the attestation challenge, generated in Step 808, to the computing device component.

In Step 812, the management service receives an attestation response from the computing device component (provided by the network adapter in Step 410, and by the server in Step 514). As previously described, the received attestation response may include the nonce, the serial number(s) of the computing device component, the requested PCR content, and a signature using an identity key, and an identifier of the identity key such as a fingerprint. In one embodiment of the invention, the management service may first verify the authenticity of the attestation response in order to ensure that the attestation response originates from the TPM of the computing device component, and has not been altered or forged. The authenticity of the attestation response may be verified by the management service, by verifying that the identity key used to sign the attestation response, provided by the computing device component, is valid, and that the signature using the identity key is valid. The validity of the identity key may be verified using a mechanism that conforms to one or more of the Trusted Computing Group standards. Once the identity key and the attestation signature have been verified, the management service may accept the attestation response as genuine, i.e., as originating from the computing device component. Next, the management service may verify that the nonce in the attestation response is the nonce provided in Step 808. Further, the management service may compare the requested PCR content against expected PCR content. In one embodiment of the invention, the expected PCR content represents software measurements obtained for approved (i.e. non-compromised) software components. The expected PCR content may be stored in a database of the management service that may contain integrity measurements for all approved software components of the computing device component, thereby enabling the management service to verify that the software components are authentic and unmodified.

In one embodiment of the invention, Step 812 may only be completed if all elements of the attestation response including, for example, the signature of the attestation response, the received serial number, the requested PCR content, and the nonce, are valid.

In Step 814, the management service identifies the other computing device component (OCDC) for mutual attestation with the computing device component. For example, if the attestation response received in Step 812 is from the server, the management service may identify the network adapter as the OCDC, and vice versa.

In Step 816, a determination is made about whether the OCDC has completed the remote attestation by completing Steps 800-812. If a determination is made that the OCDC has not completed the remote attestation, the method may proceed to Step 818, where the execution of the subsequent steps of the method is prevented by returning to Step 816 until the OCDC has completed the remote attestation. Returning to Step 816, if a determination is made that the OCDC has completed the remote attestation, the method may proceed to Step 820.

In Step 820, the management service sends a mutual attestation value or a set of mutual attestation values to the computing device component and to the other computing device component (i.e., to both the server and the network adapter). In one embodiment of the invention, the management service sends a mutual attestation value to the computing device component as soon as the computing device component has successfully attested to the management service, i.e., without waiting for the OCDC to successfully complete the remote attestation.

In Step 822, the management service receives the notifications of completed mutual attestation from the server and the network adapter (provided by the server in Step 524, and by the network adapter in Step 420). In one embodiment of the invention, receipt of the mutual attestation notification indicates that a trust relationship has been established between the server and the network adapter of the computing device, and therefore enables the management service to trust the entire computing device, and further to guarantee the integrity of the entire computing device to third parties.

Embodiments of the invention may enable a remote management service to verify the identity and integrity of a computing device without requiring a local user or administrator to inspect the computing device. The identity and integrity verification may be performed in an unsafe environment, i.e., an environment where other components, e.g., the network, or individual network components, may be compromised. The identity and integrity verification may be performed initially, when the computing device is started, and in addition, elements of the identity and integrity verification may periodically be repeated while the computing device is operating, thereby enabling the management service to take counteractive measures if the integrity of the computing device or of a component of the computing device is or becomes uncertain. Unauthorized components, e.g., imposter elements and/or computing device components that have been altered by a bad actor may therefore be detected and isolated. The management service may begin the identity and integrity verification by verifying the integrity of individual computing device components, thus enabling the individual computing device components to trust one another before they may interact. Any computing device component where the integrity is uncertain may be prevented from interacting with other computing device components. After the integrity of the computing device components has been successfully verified, and the computing device components have successfully established communication channels between the computing device components, the management service may guarantee the integrity of the entire computing device to third parties, e.g., to other computing devices, to computing device users, to software vendors, etc., thereby reducing the risk of the third party interacting with a compromised computing device.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for verifying integrity of computing devices, the method comprising:
    performing an attestation of a server of a computing device with a management service by providing, by the computing device and using a first trusted platform module (TPM), associated with the server executing on the computing device, a first integrity measurement associated with the server to the management service, wherein the server of the computing device communicates with the management service using a network adaptor;
    receiving, by the computing device, in response to providing the first integrity measurement, a first mutual attestation value from the management service using the network adaptor;
    performing an attestation of the network adaptor with the management service by providing, by the computing device and using a second TPM associated with the network adapter, a second integrity measurement associated with the network adaptor to the management service;
    receiving, by the computing device, in response to providing the second integrity measurement, a second mutual attestation value from the management service;
    performing, by the computing device, a mutual attestation between the server and the network adaptor by:
        establishing a connection between the server and the network adaptor, confirming to the network adaptor, using the received first mutual attestation value, that the server has successfully undergone attestation with the management service, and
        confirming to the server, using the second mutual attestation value, that the network adaptor has successfully undergone attestation with the management service;
    notifying, by the computing device, the management service that the mutual attestation has been successfully completed; and
    prior to successful completion of the mutual attestation:
        dropping, at the network adaptor, all packets issued by the server that are not directed to the management service and all packets directed to the server that are not from the management service.

2. The method of claim 1, wherein the connection between the server and the network adaptor is established using the first mutual attestation value and the second mutual attestation value.

3. The method of claim 1, wherein performing the mutual attestation comprises:
    providing, by the server, the first mutual attestation value to the network adaptor; and
    providing, by the network adaptor, the second mutual attestation value to the server.

4. The method of claim 1, wherein the first mutual attestation value and the second mutual attestation value are the same.

5. The method of claim 1, wherein the first mutual attestation value is a public key and the second mutual attestation value is a private key, wherein the public key and the private key are part of a public-private key pair.

6. The method of claim 1, wherein the first mutual attestation value and the second mutual attestation value are received by the computing device in a message.

7. The method of claim 6, wherein the first mutual attestation value may only be decrypted by the server and wherein the second mutual attestation value may only be decrypted by the network adaptor.

8. A non-transitory computer readable medium comprising computer readable program code, which when executed by a computer processor of a computing device enables the computer processor to:
  perform an attestation of a server of the computing device with a management service by providing, using a first trusted platform module (TPM) associated with the server executing on the computing device, a first integrity measurement associated with the server to the management service,
    wherein the server of the computing device communicates with the management service using a network adaptor;
  receive, in response to providing the first integrity measurement, a first mutual attestation value from the management service;
  perform an attestation of the network adaptor with the management service by providing, using a second TPM associated with the network adapter, a second integrity measurement associated with the network adaptor to the management service;
  receive, in response to providing the second integrity measurement, a second mutual attestation value from the management service;
  perform a mutual attestation between the server and the network adaptor by:
    establishing a connection between the server and the network adaptor, confirming to the network adaptor, using the received first mutual attestation value, that the server has successfully undergone attestation with the management service, and
    confirming to the server, using the received second mutual attestation value, that the network adaptor has successfully undergone attestation with the management service;
  notify the management service that the mutual attestation has been successfully completed; and
  prior to successful completion of the mutual attestation:
    drop, at the network adaptor, all packets issued by the server that are not directed to the management service and all packets directed to the server that are not from the management service.

9. The non-transitory computer readable medium of claim 8, wherein the connection between the server and the network adaptor is established using the first mutual attestation value and the second mutual attestation value.

10. The non-transitory computer readable medium of claim 8, wherein performing the mutual attestation comprises:
  providing, by the server, the first mutual attestation value to the network adaptor; and
  providing, by the network adaptor, the second mutual attestation value to the server.

11. The non-transitory computer readable medium of claim 8, wherein the first mutual attestation value and the second mutual attestation value are the same.

12. The non-transitory computer readable medium of claim 8, wherein the first mutual attestation value is a public key and the second mutual attestation value is a private key, wherein the public key and the private key are part of a public-private key pair.

13. The non-transitory computer readable medium of claim 8, wherein the first mutual attestation value and the second mutual attestation value are received by the computing device in a message.

14. The non-transitory computer readable medium of claim 13, wherein the first mutual attestation value may only be decrypted by the server and wherein the second mutual attestation value may only be decrypted by the network adaptor.

15. A computing device, comprising:
  a server comprising a first trusted platform module (TPM) circuit and configured to:
    perform an attestation of the server with a management service by providing, using the first TPM circuit, a first integrity measurement associated with the server to the management service,
      wherein the server of the computing device communicates with the management service using a network adaptor;
    receive, in response to providing the first integrity measurement, a first mutual attestation value from the management service;
  the network adaptor comprising a second TPM circuit and configured to:
    perform an attestation of the network adaptor with the management service by providing, using the second TPM circuit, a second integrity measurement associated with the network adaptor to the management service;
    receive, in response to providing the second integrity measurement, the second mutual attestation value from the management service; and
  wherein the server and the network adapter perform a mutual authentication between the server and the network adapter by:
    establishing a connection between the server and the network adaptor,
    confirming to the network adaptor, using the received first mutual attestation value, that the server has successfully undergone attestation with the management service,
    confirming to the server, using the received second mutual attestation value, that the network adaptor has successfully undergone attestation with the management service, and
    notifying the management service that the mutual attestation has been successfully completed;
  prior to successful completion of the mutual attestation:
    drop, at the network adaptor, all packets issued by the server that are not directed to the management service and all packets directed to the server that are not from the management service.

16. The system of claim 15, wherein the connection between the server and the network adaptor is established using the first mutual attestation value and the second mutual attestation value.

17. The system of claim 15, wherein performing the mutual attestation comprises:
  providing, by the server, the first mutual attestation value to the network adaptor; and providing, by the network adaptor, the second mutual attestation value to the server.

* * * * *